United States Patent [19]

Bombled et al.

[11] Patent Number: 5,613,653
[45] Date of Patent: Mar. 25, 1997

[54] MULTISATELLITE DISTRIBUTOR FOR LAUNCHER

[75] Inventors: Jean P. Bombled, Le Mesnil St. Denis; Jean P. Aubret, St. Medard En Jalles; Christophe Laporte, Mérignac, all of France

[73] Assignee: Aerospatiale Societe Nationale Industrielle, France

[21] Appl. No.: 408,955

[22] Filed: Mar. 22, 1995

[30] Foreign Application Priority Data

Mar. 22, 1994 [FR] France ................. 94 03334

[51] Int. Cl.⁶ .................................... B64G 1/00
[52] U.S. Cl. ............................................. 244/158 R
[58] Field of Search ......................... 244/158 R, 159, 244/1 R

[56] References Cited

U.S. PATENT DOCUMENTS 3,380,687  4/1968  Wrench et al. ....................... 244/1
3,461,801  8/1969  Vitale et al. ......................... 102/37.6
3,907,225  9/1975  Welther ................................ 244/158
5,199,672  5/1993  King et al. ........................... 244/158
5,271,582  12/1993  Perkins et al. ..................... 244/158 R
5,522,569  6/1996  Steffy et al. ....................... 244/158 R

*Primary Examiner*—Christopher P. Ellis
*Attorney, Agent, or Firm*—Hayes, Soloway, Hennessey, Grossman & Hage, P.C.

[57] ABSTRACT

A multisatellite distributor is proposed for putting into orbit a group or cluster of satellites from one or more different types of launchers. The distributor has a mast adapted for use with each of the types of launchers, and interface members for mounting the satellites or the mast. Each interface member includes systems for permitting fixing and releasing of an associated satellite, and electrical connectors by which satellite/launcher and interface member/launcher electrical connections may be established.

15 Claims, 7 Drawing Sheets

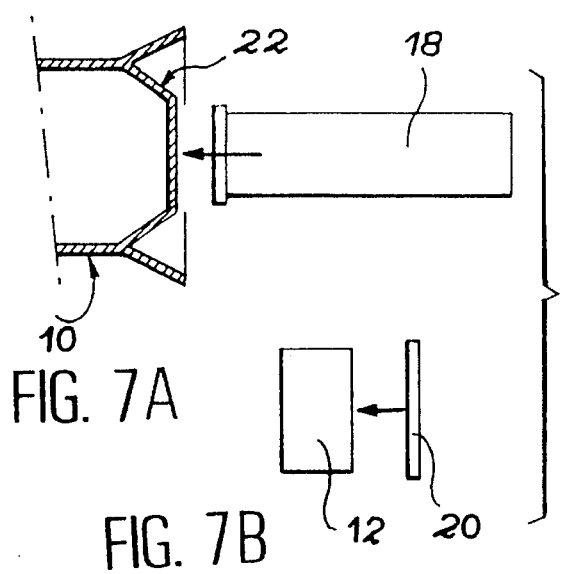
FIG. 7A
FIG. 7B
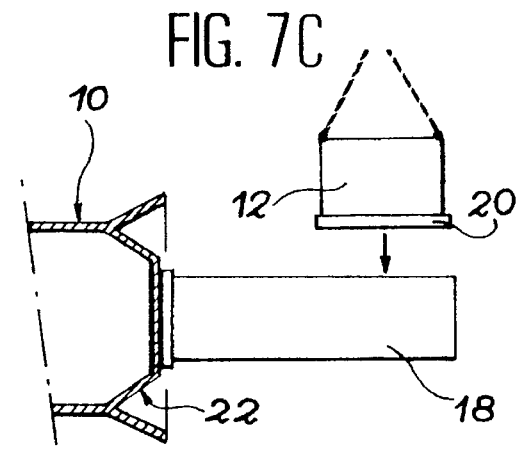
FIG. 7C
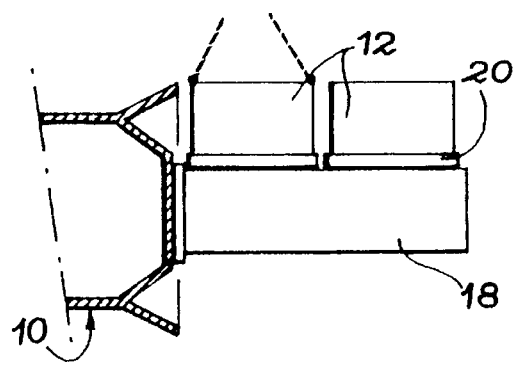
FIG. 7D
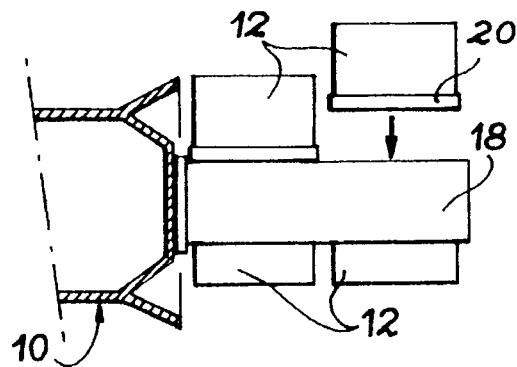
FIG. 7E
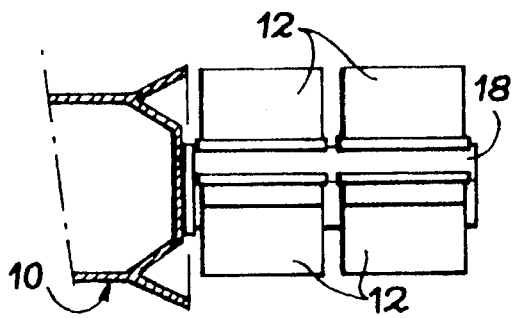
FIG. 7F

MULTISATELLITE DISTRIBUTOR FOR LAUNCHER

BACKGROUND OF THE INVENTION

1. Field of the Invention

The invention relates to a multisatellite distributor for installation on a launcher so as to permit the putting into orbit of several satellites with the aid of said launcher.

Such a device has a preferred application in programmes imposing the putting into orbit of several identical satellites. However, it can also be used for injecting into orbit different satellites, but having relatively close geometrical, unit mass and inertial dimensions.

2. Brief Description of the Related Prior Art

Initially a different launcher had to be used for putting each satellite into orbit. Over the last few years, technological evolutions have made it possible to increase the capacities of launchers, whereas the weight of the satellites increased less rapidly than their performance characteristics. Thus, with certain launchers it has been possible to simultaneously launch at least two satellites during the same flight, which leads to a considerable reduction in the costs of putting each satellite into orbit.

In practice, the methods used up to now for launching two satellites with the aid of the same launcher are directly derived from the methods used beforehand for launching a single satellite. Thus, a first satellite is generally installed at the end of the launcher with the aid of a truncated cone-shaped adaptor and the second satellite is placed on a support structure surrounding the first satellite and bearing directly on the launcher. A single nose cone can protect the pair of satellites or the upper payload, whereas the lower payload is then protected by the support structure of the other satellite which envelops it.

This method of integrating satellites on the launcher becomes virtually unusable when the number of satellites exceeds three. Moreover, it irreversibly constrains the satellite release sequence which must be the reverse of the installation sequence on the launcher.

Various other devices have been considered for launching a cluster of satellites with the aid of the same launcher. Although certain of these devices have made it possible to envisage the launching of more than three satellites, they were still of a complex nature generally imposing a launching sequence on the satellites and in particular preventing any change of program within a short period of time, when the launching of the initially planned launcher has had to be delayed beyond the normally acceptable limits.

SUMMARY OF THE INVENTION

The present invention is aimed at a multisatellite distributor, whose novel design enables the same launcher to put into orbit a cluster of satellites, whose number only depends on the space available beneath the launcher nose cone and the performance characteristics of the launcher on the intended orbit, said device being designed in such a way that the same satellite can be installed in a very short time on random launchers of the same or different types, so as to make it possible to follow a predetermined timetable, even if difficulties delay the launch date of the initially planned launcher.

According to the invention this result is obtained by means of a multisatellite distributor for the launcher and which is characterized in that it has a mast fixable to the launcher and having at least two identical locations, each of which can receive a satellite; identical interface members, each of which comprises fixing-release means by which one of the satellites can be installed on said interface member and separated therefrom; and dismantlable fixing means by which each interface member can be installed at any random one of the said locations.

When several launchers are equipped with a mast having a number of locations or positions dependent on the characteristics of the launcher in question, it becomes possible to install the satellites on one or other of the masts with the aid of interchangeable interface members, which are fitted beforehand on said satellites.

In a preferred embodiment of the invention, the dismantlable fixing means are accessible from the exterior of the mast, when a satellite is fitted to the interface member. This feature makes it possible to install a random number of satellites on the mast, no matter what the section of the latter and in particular when said section or any other reason does not enable the intervention personnel to work within the mast.

The dismantlable fixing means can in particular consist of screws installed on parts of the interface member projecting with respect to a satellite fitted to said member. Optionally said screws can be supplemented by complementary fixing mechanisms located in the vicinity of each of the screws.

In exemplified manner, each of the locations able to receive a satellite is rectangular and each of the interface members has a rectangular frame provided with four angle plates supporting the fixing-release means. The projecting parts of the interface member on which are installed the screws used for the dismantlable fixing of the interface member on any random one of the locations of the mast are then advantageously formed on the angle plates.

In the preferred embodiment of the invention, the mast incorporates an electrical and/or pyrotechnic wiring ensuring the transmission of data and/or instructions between the launcher and interface members. Each of the interface members receives said wiring and extend and branch it as a function of whether the data and/or instructions relate to them (mainly for carrying out the satellite release) or relate to the satellites, in which case they are transmitted via one or more interface connectors.

Advantageously, the mast is positioned in along a longitudinal axis of the launcher and has a substantially polygonal cross-section, defining at least three main faces each having at least one of the locations.

The invention is described in greater detail hereinafter in relation to a non-limiting embodiment and the attached drawings, wherein:

BRIEF DESCRIPTION OF THE DRAWINGS

FIGS. 7A–7F diagrammatically illustrate the different stages of the installation of a group of satellites on a launcher by means of a multisatellite distributor according to the invention.

DETAILED DESCRIPTION OF THE PREFERRED EMBODIMENT

Figure 1:
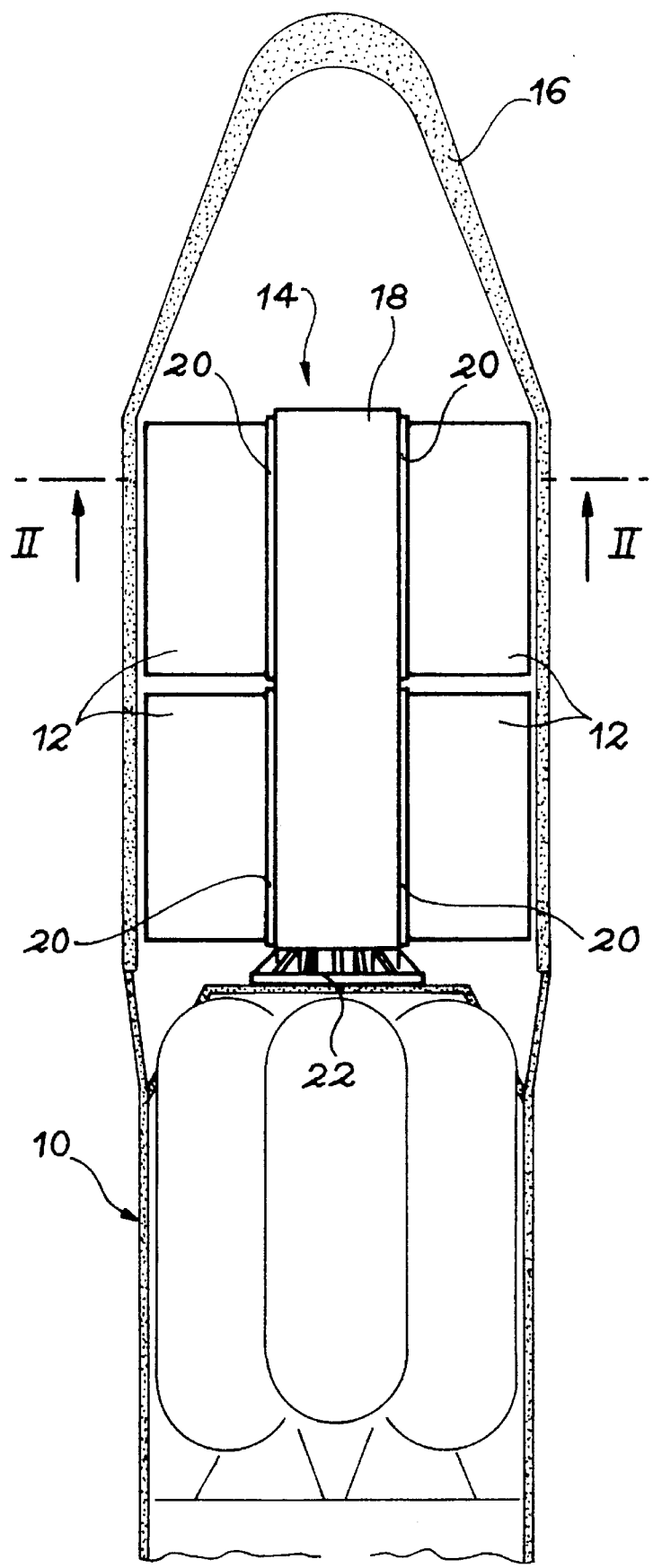
FIG. 1 is a vertical sectional view diagrammatically illustrating the upper end of a launcher, in which is installed a cluster of satellites fitted to a multisatellite distributor according to the invention.

FIG. 1 diagrammatically shows the upper stage 10 of a launcher required to put into orbit a cluster of six satellites 12, which are identical or have very similar dimensions. The satellites 12 are installed on the upper stage 10 by a multisatellite distributor 14 according to the invention. The assembly constituted by the satellites 12 and the distributor 14 is placed in a nose cone 16 fixed to the upper end of the outer envelope of the upper stage 10.

The multisatellite distributor 14 according to the invention is essentially constituted by a mast 18 and interface members 20. It also has an adaptor 22 by which the mast 18 is fixed to the structure of the upper stage 10 at the upper end thereof.

The mast 18 is mounted on the adaptor 22 so as to be positioned along the longitudinal axis of the launcher. As is illustrated on the one hand by FIGS. 2A and 2B and on the other by FIGS. 3A and 3B, the shape in cross-section of the mast 18 is dependent on the number of satellites 12 which it is possible to house beneath the launcher nose cone 16.

Figure 2A:
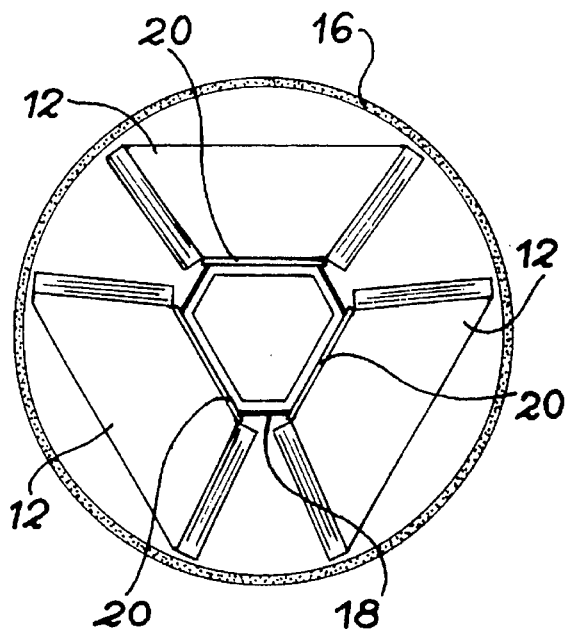
FIG. 2A is a sectional view along line II—II of FIG. 1, in the case where the diameter of the launcher nose cone makes it possible to house three satellites in the same horizontal plane.

Thus, when only three satellites 12 can be housed in the same horizontal plane, as illustrated in FIG. 2A, in cross-section the mast 14 is shaped like an equilateral triangle, whose angles are truncated. The mast 14 then has three planar, external attachment or fixing faces 24 (FIG. 2B) of equal width and the same height. In the embodiment illustrated in perspective in FIG. 2B, each of the fixing faces 24 defines two superimposed, identical locations 25 on each of which can be fixed a satellite 12 by means of an interface member 20. Thus, the launcher equipped with this multisatellite distributor can put into orbit up to six satellites.

Figure 3A:
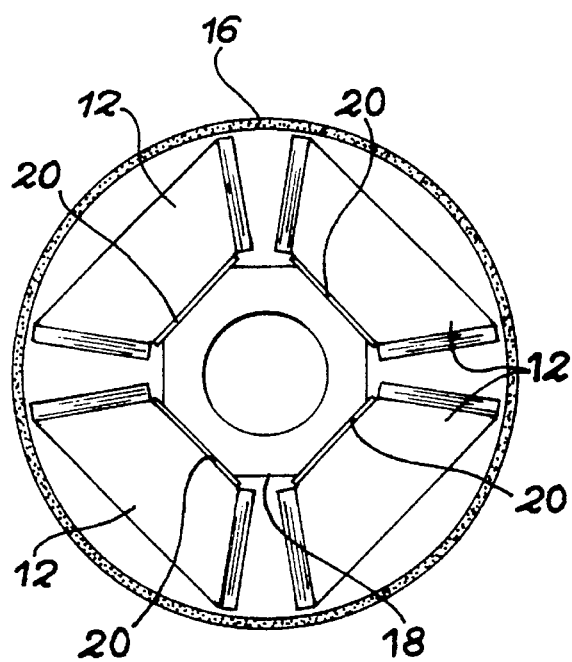
FIG. 3A is a sectional view comparable to FIG. 2A illustrating the case where the nose cone diameter makes it possible to house four satellites in the same horizontal plane.

As illustrated in FIG. 3A, when the diameter of the nose cone 16 makes it possible to house four satellites 12 on the same level, the mast 14 has in section the external shape of a square, whose angles are truncated. The mast 14 then has four external, planar fixing faces 24 of equal width and the same height. In the embodiment illustrated in FIG. 3B, each of the four attachment faces 24 defines three identical, superimposed locations 25 to each of which can be fixed a satellite 12 by means of one of the interface members 20. The launcher equipped with this multisatellite distributor can therefore inject into orbit up to twelve satellites.

The adaptor 22 serving as the interface between the launcher and the mast 18 constitutes a specific, rigid structure of the launcher initially fixed to the apex of the latter.

Figure 2B:
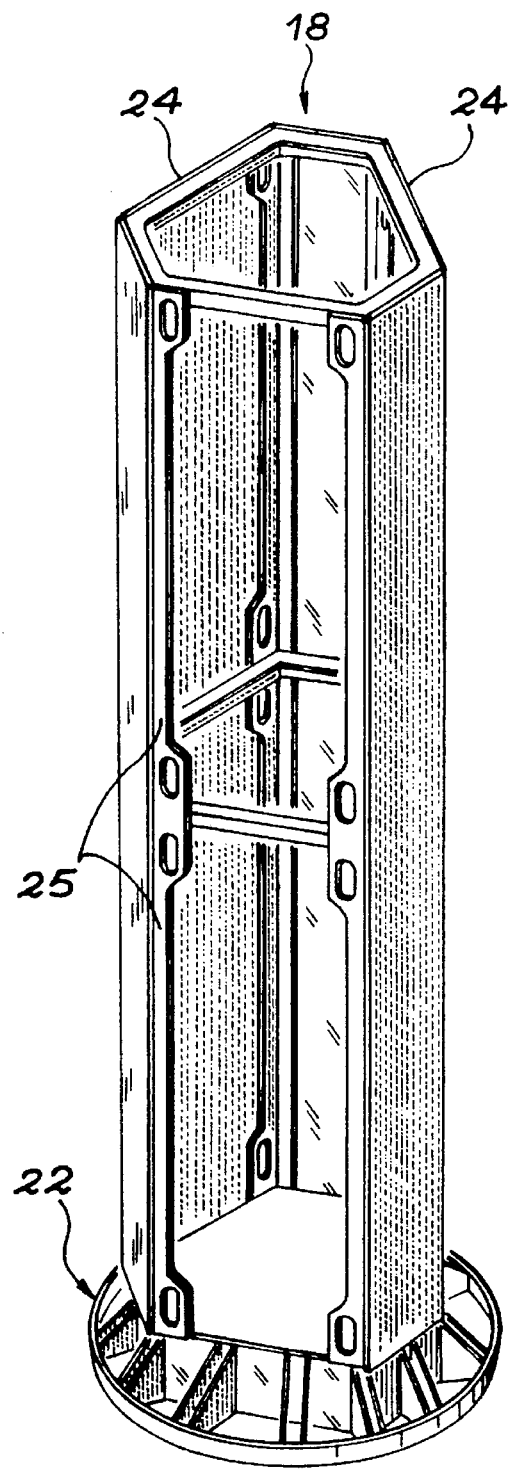
FIG. 2B is a perspective view showing the mast of the multi-satellite distributor in the case of FIG. 2A.
Figure 3B:
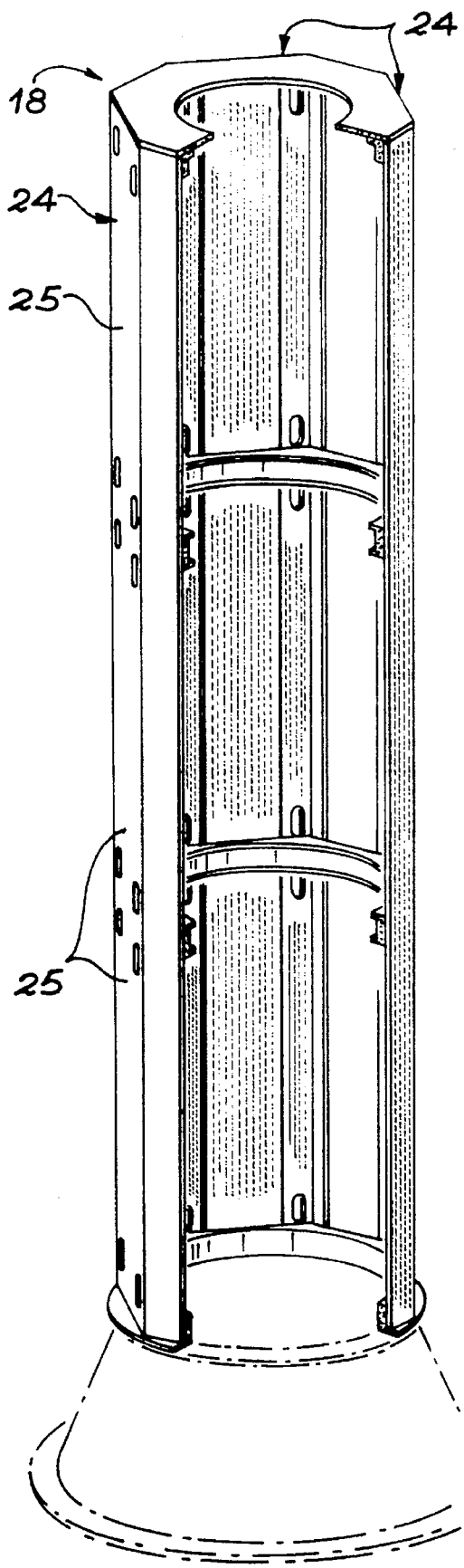
FIG. 3B is a perspective view comparable to FIG. 2 showing the multisatellite distributor mast in the case of FIG. 3A.

If, as illustrated in FIGS. 2B and 3B, the mast 14 is also specific to the launcher with regards to the number of faces of the regular polygon formed in cross-section by said mast, as well as with respect to the number of locations 25 provided on each of the external attachment faces 24, all the said locations 25 are identical to one another. It is therefore possible to install a satellite 12 equipped with an interface member 20 on any random one of these locations. In other words, the identity of the locations 25 formed on the different faces 24 of the mast 18 makes it possible to install a random satellite 12 on one or other of said locations, i.e. both on a random one of the locations 25 of a given mast 18 and on locations belonging to different masts 18 equipping launchers which can also be of the same or different types.

It is also important to note that to within the number of locations 25, the faces 24 of the masts 18 are of a mechanically and electrically standard nature. This makes it possible to obtain masts having a triangular, square and similar sections by assembling them using wedge elements of appropriate shapes.

In order to complete the interchangeable character of the satellites 12, which gives the multisatellite distributor according to the invention a great flexibility of use, it is important to observe that the interface members 20 by which each of the satellites 12 can be installed on any random one of the locations 25 are all identical and complementary of said locations 25. Therefore a satellite 12 installed on an interface member 20 can be received on any random one of the locations 25.

The locations 25 defined on each of the faces 24 of the masts 18 are rectangular. This shape and the corresponding dimensions are close to those of the planar face 13 (FIG. 4) by which each of the satellites 12 is fixed to the distributor.

Figure 4:
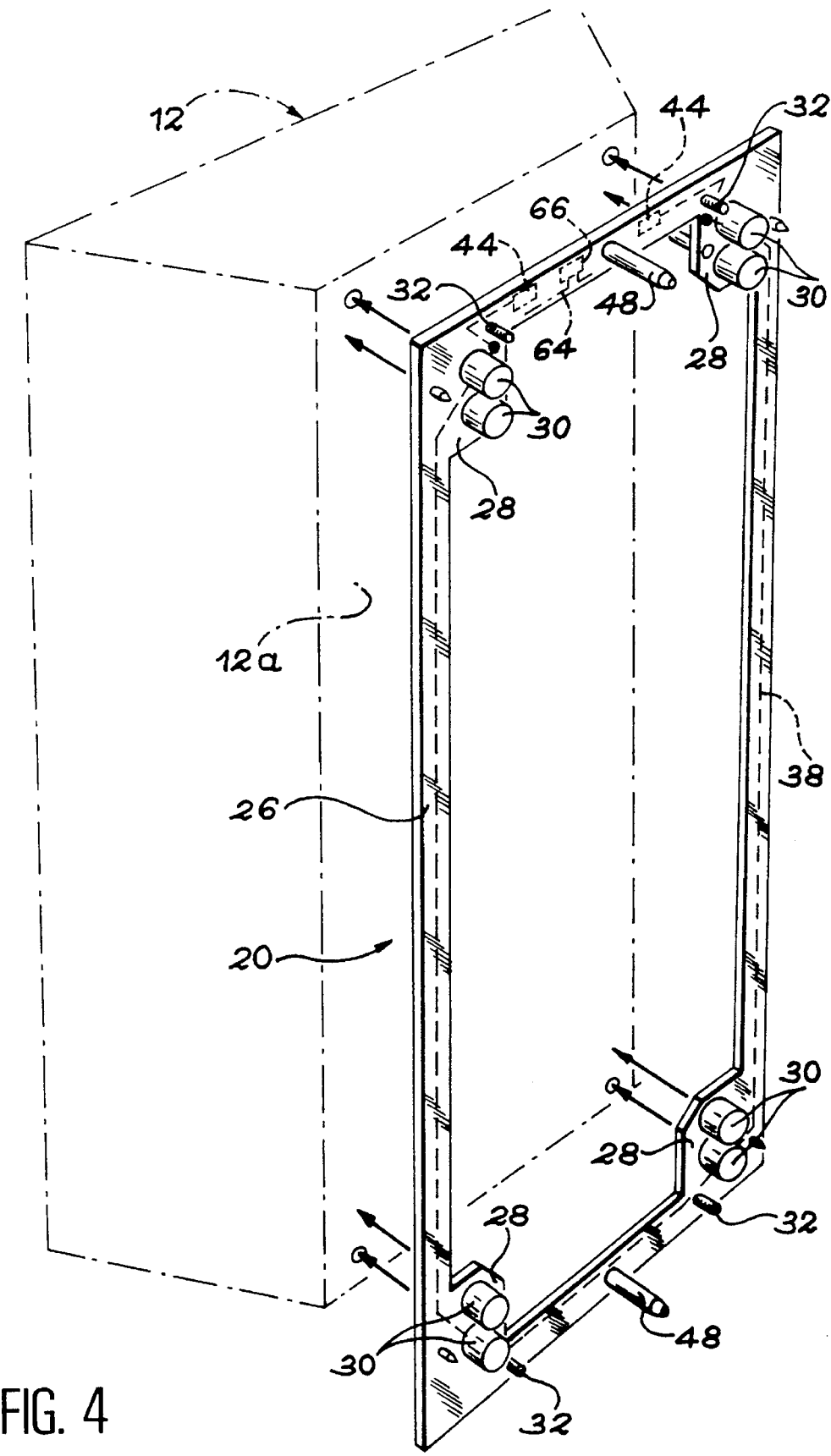
FIG. 4 is an exploded perspective view showing in continuous line form one of the interchangeable interface members of the multisatellite distributor according to the invention and in mixed line form the contours of a satellite which can be installed on said interface member prior to the fixing of the latter to one of the locations provided on the distributor mast.

In the embodiment illustrated in FIG. 4, each of the interface members 20 mainly consists of a rectangular frame 26, which supports at each of its angles an angle plate 28. Each of the angle plates 28 supports fixing-release means 30 used for fixing the satellite 12 to the interface member 20 and for controlling the separation thereof, as well as dismantlable fixing means 32 used for fixing the interface member 20 to the mast 18.

Figure 5:
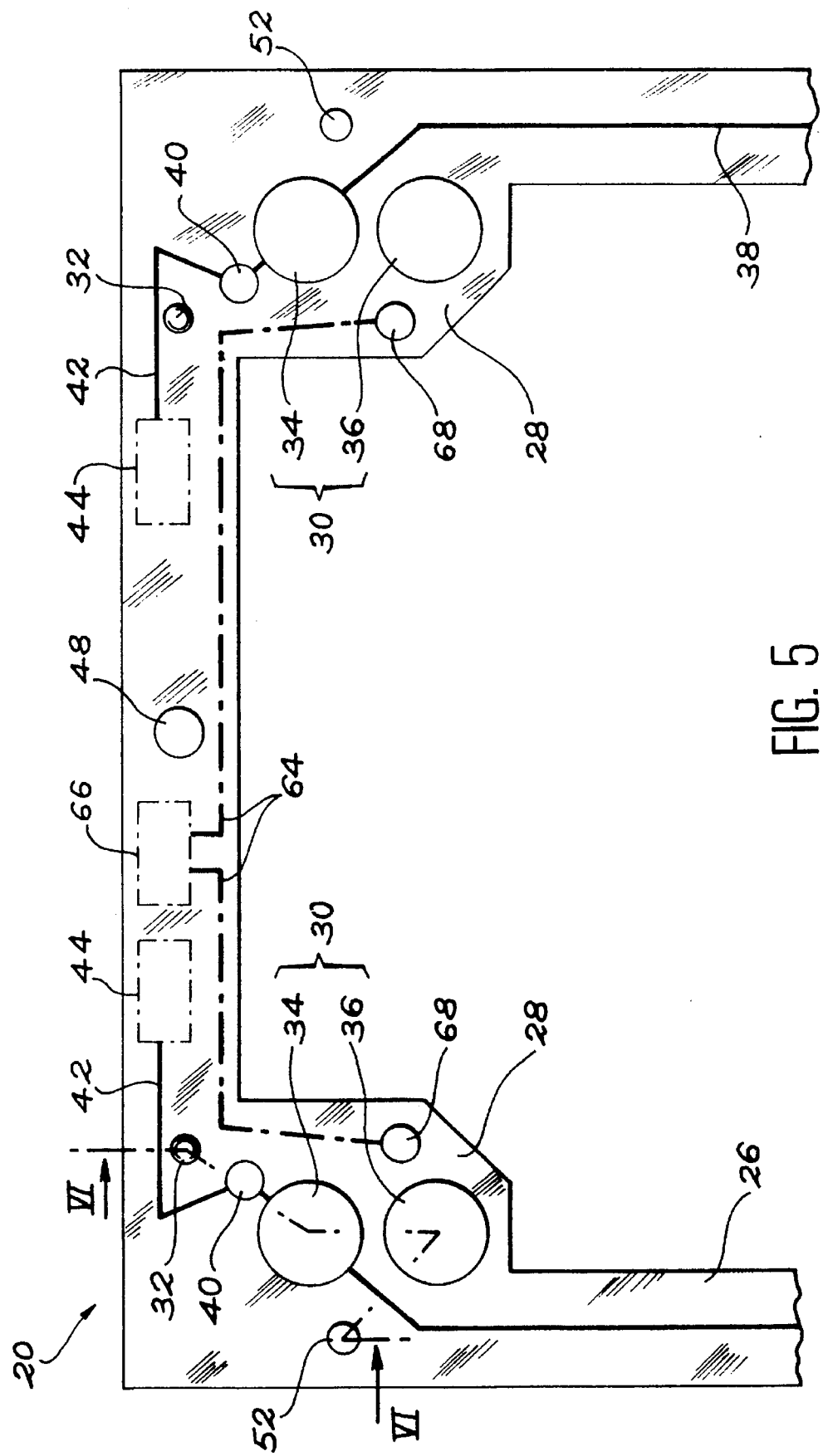
FIG. 5 is a front view showing on a larger scale the upper part of the interface member of FIG. 4.
Figure 6:
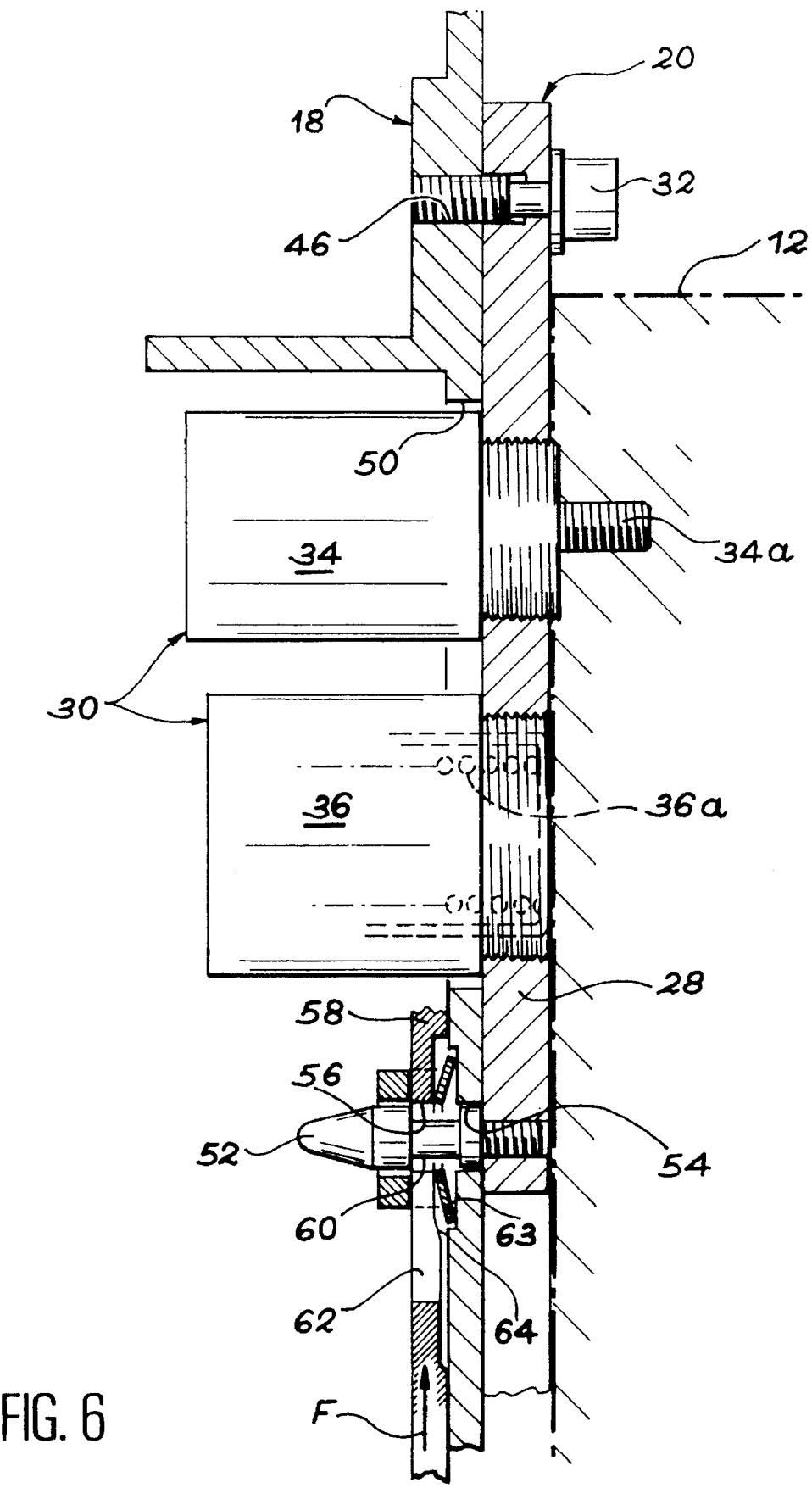
FIG. 6 is a partial sectional view along line VI—VI of FIG. 5.

As is more particularly illustrated in FIGS. 5 and 6, each of the fixing-release means 30 carried by the angle plates 28 has, in the embodiment shown, a pyrotechnic bolt-type fixing mechanism 34 (although any other process can also be used) and a spring-equipped separating mechanism 36. These two mechanisms 34 and 36 are permanently installed on each of the angle plates 28.

In non-limiting, exemplified manner, the pyrotechnic bolt fixing mechanism 34 can be constructed in accordance with FR-A-2 661 466. This makes it possible to provisionally fix with the aid of a pyrotechnic bolt 34A the satellite 12 to the interface member 20. When it is wished to release the satellite 12 fixed to said interface member 20, the four fixing mechanisms 34 are controlled in order to simultaneously break the four pyrotechnic bolts 34A.

To ensure that the breaking of the four pyrotechnic bolts 34A is simultaneous, the four fixing mechanisms 34 can be interconnected by a detonation chain 38 (FIG. 5), which passes along the frame 26. At each of its ends the detonation chain 38 is provided with a detonator 40, in such a way that the firing of one or other of said detonators brings about the simultaneous fracturing or breaking of the four pyrotechnic bolts 34A by which the satellite 12 is installed on the interface member 20 in question. The presence of two detonators 40 makes it possible to ensure the redundancy of the control. Each of the detonators 40 is connected by an electrical conductor 42 to a separate electrical connector 44, which is automatically connected to an electric supply line of the launcher, connected to a power supply, when the interface member 20 is fixed to a random location 25. The explosive bolts or unlocking devices can also be simultaneously activated by four electrical instructions arriving in parallel on pyrotechnic initiators fixed to said bolts or unlocking devices.

Moreover, the separating mechanisms 36 make it possible to eject the satellite 12 when the four pyrotechnic bolts 34A connecting the latter to the interface member 20 have broken. To this end, each of the separating mechanisms 36 incorporates a compression spring 36A, which permanently exerts a thrust force on the satellite 12 when the latter is fixed to the interface member 20 by the fixing mechanisms 34. A not shown, provisional locking device normally maintains each of the springs 36A in the compressed state when the interface member 20 has not been fixed to the satellite 12 by the fixing mechanisms 34. As soon as this fixing has taken place, the locking devices for the springs 36A are released.

The dismantlable fixing means 32 by which any interface member 20 carrying a satellite 12 can be fixed to a random location 25 of a mast 18 are designed so as to permit said fixing from the exterior of the mast. This characteristic makes it possible to facilitate the installation of satellites on the mast, particularly when the internal dimensions of the latter or any other reason do not make it possible for an operator to enter it.

For this purpose and as illustrated in FIG. 6, the height of the rectangular frame 26 of each of the interface members 20 slightly exceeds the height of the face 12A of the satellite 12 on which said interface member is fitted by the fixing-release means 30. Consequently when said installation has taken place, the frame 26 projects by a few centimeters at each of its ends beyond the contour of the satellite 12 to which it is fixed. Thus, the angle plates 28 also have parts projecting beyond the contour of the satellite 12.

In the embodiment illustrated in FIGS. 5 and 6, the dismantlable fixing means by which the interface member 20 carrying a satellite 12 can be fixed to one of the locations 25 of the mast 18 each comprise a screw 32 fitted to each of the angle plates 28 in that portion of said plate which projects beyond the contour of the satellite 12. These screws 32 can be captive screws carried by the interface member 20 or screws which are independent of the latter. When the interface member 20 is placed in front of one of the locations 25 of the mast 18, each of the screws 32 faces a taphole 46 formed in the corresponding face 24 of the mast 18.

Optionally, the positioning of the interface member 20 in front of the desired location 25 of the mast 18 can be facilitated by the presence of centering and guidance pins 48 (FIGS. 4 and 5) projecting towards the outside, e.g. on the upper and lower branches of the frame 26, when the interface member 20 is installed on a satellite 12. When the interface member 20 is placed in front of the location 25, the pins 48 are in front of not shown holes formed in the faces. The streamlined end of the pins 48 then facilitates the centering of the member 20.

As is more particularly illustrated by FIG. 6, openings 50 are formed on the faces 24 of the mast 18 in order to permit the passage of the mechanisms 34 and 36 during the fixing of the interface member 20 to each of the locations 25 formed on the faces 24 using the screws 32.

The fixing of the interface member 20 to the mast 18 with the aid of the screws 32 can be completed, if appropriate, by complementary fixing mechanisms like those diagrammatically illustrated in FIG. 6.

In the embodiment shown, these complementary fixing mechanisms comprise a finger 52 fixed to each of the angle plates 28 at a location close to that of the screws 32, but e.g. downwardly and outwardly displaced with respect to said screws. The fingers 52 project towards the outside when the interface member 20 is installed on the satellite 12. The fingers 52, the pyrotechnic bolts 34A and the screws 32 are aligned in order to limit the passage of moments into the satellite structure.

When the assembly constituted by the satellite 12 and the interface member 20 is integrated onto the launcher by fixing to any random one of the locations of the mast 18 with the aid of the screws 32, the fingers 52 enter holes 54 formed in the corresponding face 24 of the mast 18 and in holes 56 of the same diameter formed in pull knobs 58 supported in sliding manner by the mast 18. A smaller diameter region 60 of each of the fingers 52 faces the corresponding pull knob 58, when the fixing of the interface member 20 to the corresponding face 24 of the mast 18 is completed. The operator 58 then acts on a not shown, manipulating member of each pull knob 58, accessible from the outside of the mast 18, so as to make said pull knob slide in the direction of the arrow F in FIG. 6. Thus, he brings a slit 62 of the pull knob, issuing into the hole 56, in front of the smaller diameter region 60 of the finger 52. For this operation, the operator also compresses a spring washer 63, by means of the profile 64 of the face of the pull knob 58, against which said spring washer 63 bears. Thus, a prestress is introduced into the connection. The pull knob 58 then bears on the end of the finger 52 and ensures a complementary fixing of the interface member 20 to the corresponding face 24 of the mast 18. A not shown bolt maintains the pull knob 62 in this position.

It should be noted that the same pull knob 58, e.g. passing along a vertical branch of the frame 26 can be used for simultaneously locking two fingers 52 of the same interface member 20. The control of the two pull knobs 58 from outside the mast then ensures the locking of the thus formed, complementary fixing mechanisms.

When the integration of a satellite 12 on the launcher has taken place by the means described hereinbefore, different data must be transmitted in the form of electrical signals between the satellite and the launcher.

In order to ensure this data transfer, each of the interface members 20 also supports at least one electrical conductor 64 (FIG. 5), as well as connectors 66, 68 by which the ends of said conductors 64 are respectively connected to electrical installations of the satellite 12 and the launcher when the fixing-release means 30 and the dismantlable fixing means 32 have respectively been used for installing the satellite 12 on the interface member 20 and then for installing the latter on the mast 18.

The above description shows that the multisatellite distributor according to the invention constitutes a particularly simple and inexpensive device, which makes it possible to very rapidly and reversibly integrate different satellites, previously associated with an interface member, at a random location 25 of the same mast 18 or different masts equipping launchers, no matter whether the latter are or are not of the same type. This modularity or interchangeability results from the combined use of identical interface members 20 and masts 18 adapted to the launchers, provided with identical locations 25, complementary to the interface members. In addition the multisatellite distributor according to the invention makes it possible to launch satellites installed on said distributor in a random order.

The integration of a cluster of satellites on a launcher with the aid of the multisatellite distributor according to the invention will now be described relative to FIGS. 7A–7F.

For the installation of satellites on the distributor, the latter is generally placed on an assembly bench with its longitudinal axis in the horizontal position. In certain cases, the distributor may have already been fixed to the stage 10 via the adaptor 22, in which case the upper stage and its supports serve as the assembly bench (see FIG. 7A).

Independently and as shown in FIG. 7B, an interface member 20 is fixed to each of the satellites 12 involved in the operation with the aid of fixing mechanisms 34.

It should be noted that these two preparatory stages can be performed at a random time preceding the integration of the satellites onto the launcher or launchers.

As indicated in FIG. 7C, the integration of the satellites 12, supplied by means of slings, to the distributor brought about by the fixing of the interface members 20 to the mast 18 with the aid of screws 32 and optionally pull knobs 58, starts by the installation of a first satellite 12 on a location 25 preferably in the vicinity of the adaptor 22 (although this is not obligatory).

In the same way integration then takes place of another satellite 12 on the location 25 closest to the face 24 of the mast 18 carrying the first satellite. This stage, illustrated in FIG. 7D, can be followed by one or more comparable stages if the characteristics of the launcher make it possible to have more than two locations 25 on each of the faces 24 of the mast 18.

When the integration of the satellites 12 on a first face 24 of the mast 18 is completed, integration operations comparable to those illustrated at in FIGS. 7C and 7D are repeated for a second face 24 of the mast 18, as illustrated in FIG. 7E, following the axial rotation of the distributor.

As a function of the number of faces 24 of the mast 18, these operations are repeated one or more times until all the locations 25 available on the mast 18 carry a satellite 12, as illustrated in FIG. 7F. However, it should be noted that the multisatellite distributor according to the invention can also be partially used, i.e. without all the available locations 25 on the mast 18 being utilized. It should also be noted that the integration of the satellites can be performed by successive rings. An integration of the satellites 12 with the distributor in the vertical position is also theoretically possible.

In addition, if the integration order of the satellites on the launcher, illustrated in FIGS. 7C–7F, constitutes a preferred integration order, the integration of the satellites can in certain cases take place in a different order without passing outside the scope of the invention.

It should finally be noted that the embodiment described with reference to the drawings only constitutes a non-limiting example. Thus, as a function of the characteristics of the launcher used, the number of faces 24 of the mast 18 can be of a random nature equal to or greater than 1. In the same way the number of locations 25 available on each of these faces can be of a random nature equal to or greater than 1, provided that the total number of available locations on the mast is at least 2. The consequence of this is that although the arrangement of the mast 18 along the longitudinal axis of the launcher is a preferred arrangement, a multisatellite distributor according to the invention equipping a small capacity launcher can comprise a mast laterally displaced with respect to the longitudinal axis of the launcher in such a way that one or two satellites can be installed on the face turned towards said axis, by means of interface members having the characteristics of the invention. Moreover, to the satellites carried by the mast can be added a satellite also installed by an interface member 20 on a location, which is e.g. horizontal and provided on a support above the mast. This support can in particular be carried by jambs containing the equipped mast.

Moreover, the rectangular shape given to the interface members in the embodiment described only constitutes a non-limiting example. Thus, each of the interface members can be constituted by two parallel bars embodying two opposite sides of the rectangle, in the geometry described, or a frame of polygonal, circular or similar shape, if the locations provided on the masts have different shapes.

We claim:

1. A multisatellite distributor for a launcher, comprising:
   a. a mast fixed to said launcher and having a plurality of identical locations; and
   b. a plurality of identical interface members, each of said interface members being for mounting a respective one of a plurality of satellites to a respective one of said plurality of identical locations, each of said interface members having a frame member including:
      removable fixing means for permitting the frame member to be removably affixed to any one of said locations of said mast,
      fixing-releasing means for permitting any one of said satellites to be removably affixed to said frame member and for controlling separation thereof from said frame member, and
      connecting means for automatically providing, when said frame member is fixed to said mast by said removable fixing means, at least one electrical connection between the frame member and the location to which said frame member is fixed.

2. A distributor according to claim 1, wherein when a satellite is mounted on one of said interface members, the removable fixing means of said one interface member is accessible from the outside of the mast.

3. A distributor according to claim 2, wherein the removable fixing means associated with said one interface member comprises screws fitted to projecting pans of said one interface member which project with respect to the satellite mounted on said one interface member.

4. A distributor according to claim 3, wherein the removable fixing means of said one interface member also comprises complementary fixing mechanisms located in vicinity of each of the screws.

5. A distributor according to claim 3, wherein each of the locations is rectangular and each of the interface members has a rectangular frame provided with four angle plates for supporting the respective fixing-releasing of each of said interface members.

6. A distributor according to claim 5, wherein the projecting parts of said one of said interface members are formed on the angle plates of said one interface members.

7. A distributor according to claim 1, wherein each of the interface members comprises at least one first connector for electrically connecting the respective fixing-releasing means of each of said interface members to a power supply of the launcher.

8. A distributor according to claim 1, wherein each of the interface members comprises at least one electrical conductor for electrically connecting at least one second and one third connectors to electrical installations of the launcher and the satellites when the satellites are mounted to the interface members and the locations.

9. A distributor according to claim 1, wherein the mast is positioned along a longitudinal axis of the launcher and has a substantially polygonal cross-section defining at least three faces each having at least one of the locations.

10. A multisatellite distributor for launcher, said distributor comprising a mast fixable to the launcher and having at least two identical locations, each of which can receive a satellite; identical interface members, each of which comprises fixing-release means by which one of the satellites can be installed on said interface member and separated therefrom; and removable fixing means by which each interface member can be installed on any random one of the locations, said removable fixing means being accessible from the outside of the mast when a satellite is installed on the interface member said removable fixing means comprising screws fitted to projecting parts of the interface which project with respect to a satellite installed on said member, and wherein each of the locations is rectangular and each of the interface members has a rectangular frame provided with four angle plates supporting the fixing-release means.

11. A distributor according to claim 10, wherein the removable fixing means also comprise complementary fixing mechanisms located in the vicinity of each of the screws.

12. A distributor according to claim 10, wherein said projecting parts of the interface member are formed on the angle plates.

13. A distributor according to claim 10, wherein each of the interface members comprises at least one first connector for electrically connecting the fixing-release means to a power supply of the launcher.

14. A distributor according to claim 10, wherein each of the interface members comprises at least one electrical conductor for electrically connecting at least one second and one third connectors to electrical installations of the launcher and the satellite when the satellites are mounted to the interface members and the locations.

15. A distributor according to claim 10, wherein the mast is positioned along a longitudinal axis of the launcher and has a substantially polygonal cross-section defining at least three faces each having at least one of the locations.

* * * * *